Patented Apr. 11, 1939

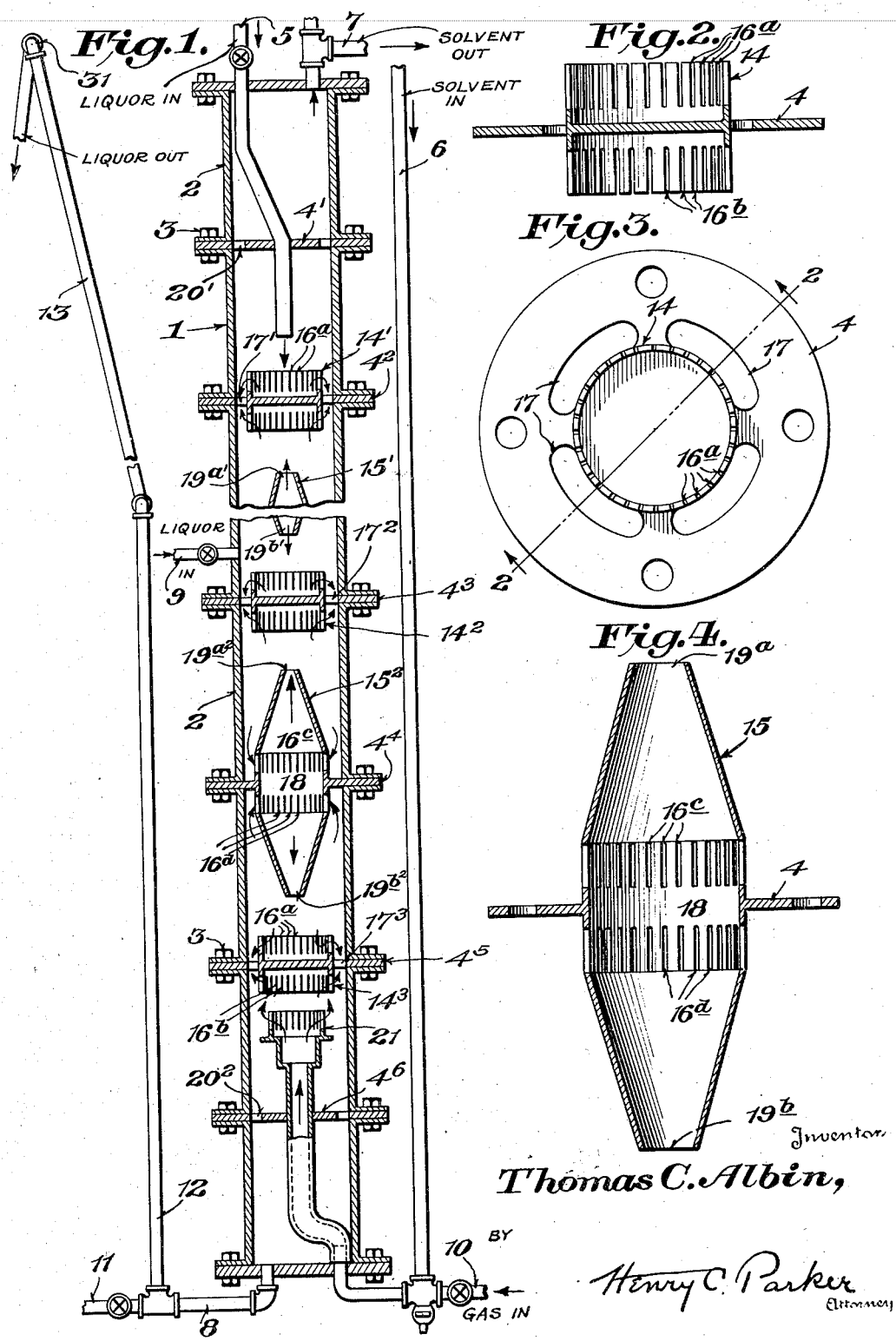

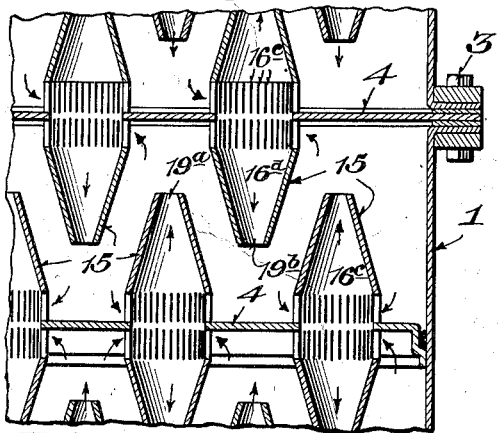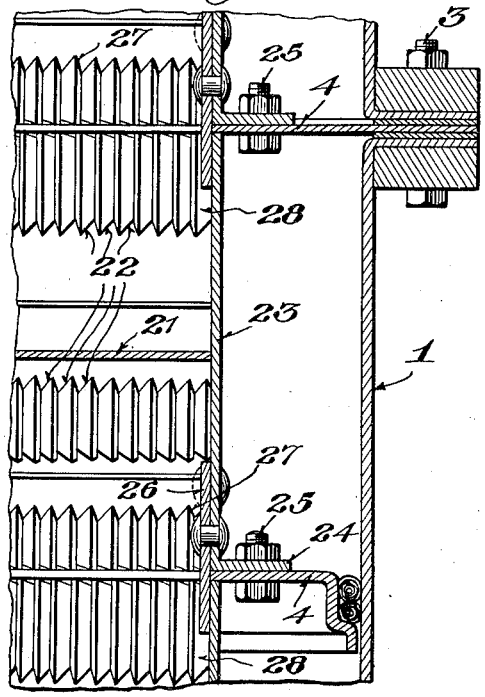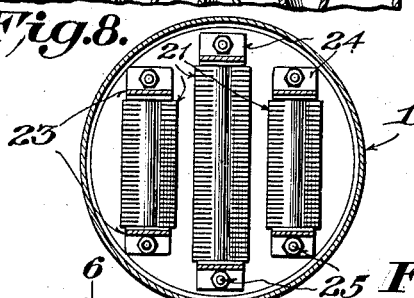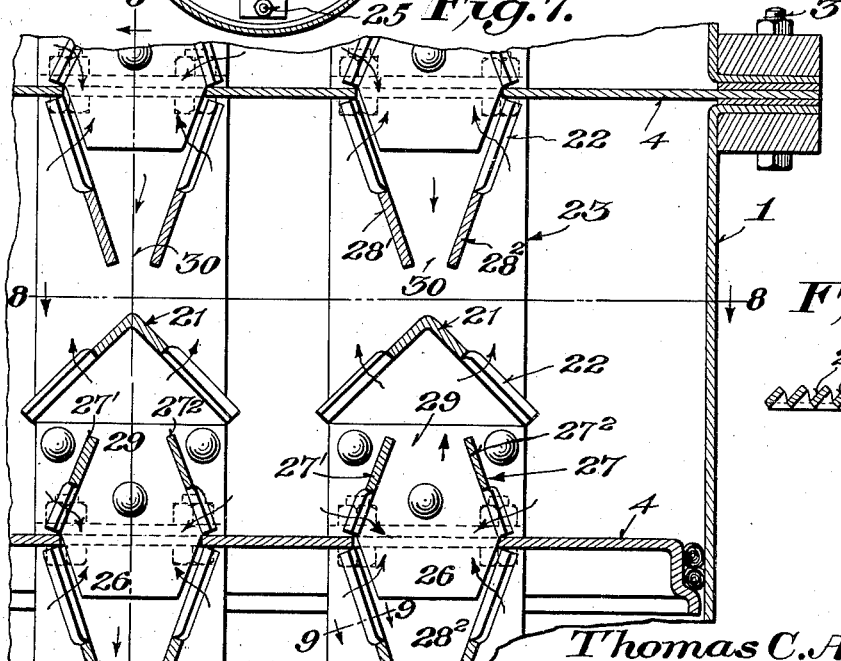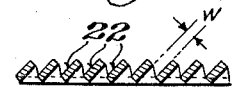

2,154,144

UNITED STATES PATENT OFFICE 2,154,144

APPARATUS FOR EXTRACTING LIQUIDS WITH LIQUIDS

Thomas C. Albin, Memphis, Tenn., assignor to Forest Products Chemical Company, a corporation of Tennessee Application February 25, 1937, Serial No. 127,807

8 Claims. (Cl. 23—270)

This invention relates to apparatus for extracting liquids with liquids, and it comprises an apparatus comprising a tower, means for introducing liquids into and withdrawing liquids from said tower located both at the top and at the bottom thereof, transverse partitions in said tower defining a plurality of extraction zones, and means for passing at least one of said liquids through said partitions and into said extraction zones in the form of a plurality of ribbon-like sheets or films having a constant thickness and usually a uniform velocity; all as more fully set forth and as claimed.

In the industrial arts there are many processes which involve the extraction of liquids with liquids. Many different types of extraction equipments have been proposed and a large number of these are in actual use. In one common extraction method a liquid, containing a material to be extracted, is introduced into a tower and passed in countercurrent to an extraction liquid which is immiscible therewith and of different specific gravity. Various methods have been suggested for obtaining intimate liquid-liquid contact in this process. In some cases packed towers have been employed. Various methods of distributing the liquids in each other have been used. For example, one or both liquids have been passed through perforated plates of various types. And it has been suggested to divide the extraction tower into a plurality of extraction zones by means of partitions, each of said zones being provided with mechanical agitation.

In all the liquid-liquid extractors which have been proposed heretofore the liquids have been distributed in such fashion that spherical drops of one liquid have been formed in a body of the second liquid. It is well known, of course, that a sphere has less surface area per unit of volume than any other shape in three dimensions and also that the surface area per unit of volume decreases rapidly as the volume of the sphere increases. I attribute the low extraction efficiencies of the prior art liquid-liquid extractors to the fact that, when the liquids are contacted in these extractors, at least one is in the form of spherical drops. Moreover, the spherical drops formed in these prior art extractors invariably collide with each other forming larger drops and thus reducing the area of contact still further. And as the rate of feed increases larger drops are formed and more frequent collisions occur, which probably accounts for the greatly reduced efficiencies obtained at the higher rates of feed. It is evident from these considerations that the prior art extractors employ the least efficient method of obtaining a large effective area of liquid-liquid contact.

It has been recognized that one of the most difficult problems to be solved in the design of extraction towers involves the development of an apparatus providing intimate contact of the liquids without the formation of emulsions. If the distribution of the liquids inter se is insufficient, a low efficiency of extraction results while if this distribution is too complete, the liquids are difficult to separate and losses occur. Some of the designs which have been proposed are capable of producing a fair efficiency of extraction for certain specific rates of flow. But there are few industrial applications wherein the rates of flow can be maintained constant and at such particular values that high efficiencies of extraction can be obtained. In none of the extractors with which I am familiar has it been possible to obtain uniformly high extraction efficiencies with different rates of feed.

From theoretical reasons it should be possible to calculate the performance of liquid-liquid extractors, from the partition coefficients of the liquids involed, by much the same mathematical treatment which has been found so valuable in predicting the performance of the distilling columns which are used in separating materials by fractional distillation. Up to the present time, however, no simple apparatus has been devised in which a plurality of stages of extraction are employed and in which high uniform efficiencies have been obtained. For this reason it has been a difficult problem to design extractors for industrial installations. Accurate prediction of the results to be obtained in practice has been found impossible.

I have developed an extractor in which these difficulties have been overcome, this new extractor operating in one or more stages and giving a high uniform efficiency of extraction, this efficiency being substantially independent of the rate of flow within the capacity of the extractor. In each stage a substantially constant percentage of theoretical extraction efficiency is obtained. This is accomplished by the use of distributors provided with narrow slits disposed at a sufficient angle to the horizontal to cause the extraction liquid or both liquids to assume ribbon-like forms in passing from one extraction zone into the next, these ribbon-like forms having a constant thickness and a substantially equal velocity but usually having a width which varies substantially directly with the rate of flow of the liquid which is being distributed. By these methods the area of liquid-liquid contact per unit of flow remains substantially constant and a high efficiency of extraction results which is practically independent of the rate of flow. The performance of this new extractor is therefore capable of being predicted with accuracy.

It is advantageous to employ an extraction tower equipped with a plurality of transverse partitions or plates which define a corresponding number of extraction zones and to maintain in these zones bodies of the liquid which is to be extracted, these bodies of liquid forming the continuous phase. The transverse plates are then equipped with means for collecting the extraction liquid and distributing it in the form of thin sheets or films into the bodies of liquid in the extraction zones. Means may also be provided for passing said bodies of liquid from one extraction zone to another in the form of thin sheets or films. The transverse plates are usually provided with slotted elements through which the liquid or liquids may pass.

If the ribbon-like sheets or films produced in my extraction tower provide a sufficient area of contact, that is, if these films are sufficiently thin and if the distances through which they pass is sufficiently great, the extraction obtained in each zone approaches the theoretical. The percentage extraction in a given tower can be calculated with a considerable degree of accuracy and it is only necessary to provide a sufficient number of extraction zones in order to obtain practically any desired degree of extraction, within obvious limits.

My invention can be explained in greater detail by reference to the accompanying drawings which show, more or less diagrammatically, an assembly of apparatus elements within the purview of my invention. In this showing:

Fig. 1 represents a vertical section of an extraction tower provided with several extraction zones, Fig. 2 is an enlarged vertical section of one of the liquid distributors shown in the tower of Fig. 1, taken along the line 2—2 of Fig. 3, Fig. 3 is a plan view of the distributor of Fig. 2, Fig. 4 is an enlarged vertical section of a complementary type of distributor, also shown in the tower of Fig. 1, Fig. 5 is a partial vertical section of a modified tower provided with distributors of the type shown in Fig. 4, Fig. 6 is a partial vertical section of a tower provided with a modified form of distributor, this section being taken along the line 6—6 of Fig. 7, Fig. 7 is a partial vertical section of the tower shown in Fig. 6, this section being taken at right angles to that shown in Fig. 6, Fig. 8 is a horizontal section of the tower on a smaller scale, along the line 8—8 of Fig. 7, Fig. 9 is a detail view, being a partial section along the line 9—9 of Fig. 7 and showing the arrangement of slots.

In the various figures, like elements are designated by like reference numerals. Referring to Fig. 1, the tower, shown generally at 1, is constructed of a plurality of flanged sections 2, which are secured together by bolts 3. The tower plates $4^1$ to $4^6$ are supported by having their peripheries clamped between the flanges of the tower sections.

The tower is provided with liquid inlet pipes 5 and 6 which introduce liquid at the top and at the bottom of the tower, respectively, and also with liquid exit pipes 7 and 8 at the top and at the bottom. If it is desired to extract a liquor with two different solvents, the liquor may be introduced at an intermediate point by means of the pipe 9, for example. In this case pipes 5 and 6 are employed for the introduction of the solvents. If the liquor to be extracted is heavier than the solvent, the liquor is introduced at the top of the tower and the solvent at the bottom, as indicated by the legends on the drawings, while if the gravities of these liquids are reversed, the points of introduction are also reversed.

If desired an inert gas can be introduced at the bottom of the tower, through the line 10. The heavy liquid removed at the bottom of the tower may be drawn off through the valved line 11 or through line 12. Line 12 is provided with a swing-pipe 13 for regulating the height of the liquor in the tower.

The tower of Fig. 1 is shown to be equipped with a plurality of plates $4^2$ to $4^5$ on which are mounted the two different types of liquid distributors, 14 and 15, shown enlarged and in greater detail in Figs. 2 and 4, respectively. The distributors shown in these figures are formed in two halves which extend above and below the plates 4. The distributors are provided with a series of narrow slits $16a$, $16b$, $16c$ and $16d$ which may be formed in the metal by a stamping operation. These slits, in effect, form narrow, rectangular wiers through which the liquids flow, thereby assuming the shape of ribbon-like streams. It may be said that the liquid is, in effect, extruded through these slots.

The cup-shaped distributors 14 are closed at their centers by the plates 4. These distributors act as means for collecting the liquids and then as means for distributing the collected liquids in thin sheets or films, which liquids then pass through plates 4 by means of openings 17. The distributors 15 are open at their centers, the plates 4 being cut away as shown at 18 for reception of these distributors. The liquids collect upon the plates which support distributors 15 and, after a sufficient depth has accumulated they pass through the slits $16c$ or $16d$ and then through the plate openings 18 inside of these distributors and into the next succeeding extraction zone.

The course of the counterflowing liquids through the tower of Fig. 1 can be easily followed by means of the arrows. The heavy liquid, which may be a liquor to be extracted, enters the top of the tower through the pipe 5. Then, if the light liquid forms the continuous phase, the heavy liquid falls into distributor 14 owing to its high specific gravity. When sufficient heavy liquid has collected in the upper distributor $14^1$, it overflows through the slits $16a$ in the form of ribbons and through the openings $17^1$ in the plate $4^2$. Openings $17^1$ are located around the periphery of the distributor adjacent the wall of the tank, hence the heavy liquid tends to fall vertically from these openings to the periphery of the next lower plate which is provided with a distributor $15^1$. The heavy liquid collects on the plate around distributor $15^1$ until its height is sufficient to pass through the slits $16c$ in the form of ribbons and into the inside 18 of distributor $15^1$, from which position it falls downwardly through the frustroconical section of the distributor and out through the constricted opening $19b$, into the next lower distributor $14^2$, thus passing from plate to plate and finally passing through the openings $20^2$ in the bottom plate $4^6$ and then out through exit pipe 8. When the heavy liquid forms the continuous phase this liquid does not necessarily pass through the slits 16a. It does, however, of necessity pass through the slits 16c of distributors 15.

In a very similar manner the light liquid enters at the bottom of the tower, first passing through the small distributor 21 in the form of ribbons. If the heavy liquid constitutes the continuous phase, it then rises to be collected by the distributor 14³, passing through the slits 16b in this distributor in the form of ribbons, passing upwardly through the openings 17³ in the plate 4⁵, rising and collecting under the plate 4⁴, passing through the slits 16d of distributor 15², passing upwardly through the constricted opening 19a² of this distributor, then passing into the inside of distributor 14², and flowing in this manner from plate to plate until it finally passes through openings 20¹ in plate 4¹ and out through exit pipe 7 at the top of the tower. If the lighter liquid forms the continuous phase it does not necessarily pass through the slits 16b of distributors 14 but it is forced to pass through the slits 16d of distributors 15 owing to the fact that the heavy liquid passes downwardly through openings 19b of these distributors. It is thus seen that, no matter which liquid forms the continuous phase, both liquids pass through the slits of distributors 15 in the form of ribbons which flow in counter-current through the centers 18 of these distributors. The resulting turbulence produces an excellent contact of the liquids at this point.

When the tower is sufficiently large to have more than one distributor located on each of its plates, it is possible to use the frustro-conical type of distributor exclusively, as shown in Fig. 5. In this case the liquids collect on each of the plates before passing through the slits 16c or 16d and then through the center openings 18 provided in the distributors. The arrows in Fig. 5 show the courses taken by the liquids.

For the larger types of towers the modified distributor shown in Figs. 6 and 7 has some advantages. In this modification the horizontal sections of the distributors are rectangular rather than circular. These distributors can be readily made from sheet metal. I have found that the slits can be made by slitting the edges of metal sheets into vanes or tongues 22 which are twisted slightly, as shown best in Fig. 9 which is an end view of the bent metal tongues. The width of the slits is determined by the distance between two adjacent tongues, taken along a line perpendicular to the surfaces of the tongues, this distance being indicated at $w$ in Fig. 9. Distributors 21, shown in Figs. 6 and 7, are made by slitting the two sides of a metal sheet and bending it slightly in the center midway between the slits. These distributors may be mounted in the tower, by welding or otherwise, between end plates 23. These end plates are provided at their bases with flanges 24, these flanges being bolted at 25 to the plates 4. The action of these distributors 21 is very similar to that of the lower parts of distributors 14. The light liquid collects beneath the domed, solid portions of the distributors and then passes through the slit walls. The distributors 21 are partially supported by the short end plates 26 which may be riveted or otherwise secured to end plates 23. The lower ends of plates 26 are tapered in order to fit between the lower distributor plates 28.

Distributors 27 and 28 are each made from two metal sheets or strips, 27¹, 27², 28¹ and 28², respectively; see Fig. 7. One edge of each of these sheets is slit, as shown in Fig. 9, and the sheets are mounted between end plates 23 by welding or soldering, for example, with the slit edges adjacent the plates 4 and with the other edges converging somewhat to form restricted openings 29 and 30, as shown in Fig. 7. Distributors 27 and 28, when arranged in the manner shown in Fig. 7, perform the functions of the distributors 15, shown in Figs. 1, 4 and 5, the only difference being that they have a rectangular horizontal section in place of the circular horizontal section of distributors 15. The plates 4 are, of course, provided with corresponding rectangular openings between distributors 27 and 28 to permit passage of the liquids.

It is convenient to mount a distributor 28 at the top of one pair of end plates, a distributor 21 centrally and a distributor 27 at the bottom, this assembly forming a single unit which can be inserted between the plates 4 with other similar units above and below. These units may be made of standard length, that is, with equal distances between the end plates, in which case several of these units may be placed end-to-end across the center of the larger towers with a smaller number of units placed end-to-end on either side of and parallel to the central units. On the other hand, it is possible to make the units of different lengths, with the longest in the center, as shown in Fig. 8 which is a reduced view looking down on distributors 21.

It will be noted that, in the modifications of my invention which are illustrated in the drawings, the liquids pass through my extractors in sinuous paths. This is important in increasing the length of time of contact in the extraction zones. In all embodiments the openings in the plates through which the liquids pass can be said to be surrounded by flanges provided with narrow slits arranged at an angle to the horizontal, said flanges and slits being so constructed as to force liquid collected on the plates to pass through the slits in ribbon-like films.

In all embodiments of my distributors the width of the slits should be small in order to distribute thin ribbons of liquid in which equilibrium concentrations of the material to be extracted may be attained before the extruded liquid leaves the extraction zone. I have found that the slit width to be employed varies to some extent with the viscosity of the liquids, the depth of the extraction zones, the relative gravities of the liquids and with various other factors. With liquids of low viscosity, such as water and ethyl acetate, I have used slits having a width of only $\frac{1}{64}$ inch with excellent results. My experiments indicate that the maximum width which should be employed, if extraction efficiencies approaching the theoretical are to be obtained, is about $\frac{1}{8}$ inch. I usually employ slits having a width of about $\frac{1}{32}$ inch.

In operating my extraction tower in a practical operation, I passed pyroligneous acid having an acetic acid content of about 7 per cent through an extractor of the type shown in Fig. 1, this extractor having 14 plates 4 inches in diameter. The acid was introduced at the top of the tower and was passed in countercurrent to ethyl acetate which was introduced at the bottom. The ethyl acetate, containing dissolved acetic acid and some dissolved water, was drawn off at the top of the tower, while the acid slops, containing a small amount of dissolved ethyl acetate and being substantially free from acetic acid was drawn off at the bottom of the tower. The rate of flow of the acid was about 4 gallons per hour, while the ethyl acetate was passed through the tower at a rate of about 12 gallons per hour. It was found that the slops contained less than 0.1 per cent of acetic acid in this particular run, the extraction being about 99 per cent complete.

The above run was started by filling the tower with the pyroligneous acid within a short distance of the top before starting the flow of ethyl acetate. The swing pipe was adjusted until the level of the body of acid liquor was just above the top of the tower but below the exit pipe. Since the acid in the swing pipe had a gravity above the average gravity of the liquid in the tower, this pipe was lowered until its upper joint 31 was a short distance below the top of the tower. The acid liquor then formed the continuous phase and the ethyl acetate the dispersed or discontinuous phase.

It is possible, of course, to operate my extractor in such fashion that the ethyl acetate is the continuous phase and the acid the discontinuous phase. This is accomplished by lowering the swing pipe until the column of acid liquor in this pipe will approximately balance a column of ethyl acetate having a height corresponding to the height of the tower or so the level of the acid liquor is maintained just above the bottom of the tower. It is also possible to operate the extractor in such fashion that the acid liquor is the continuous phase at the bottom of the tower and the ethyl acetate is the continuous phase at the top of the tower. In order to accomplish this, the swing pipe is lowered about half way between the two positions mentioned previously.

One important advantage of my new liquid-liquid extractor is that it does not become air bound. Many of the extractors in common use have this disadvantage. I have found that the passage of air or inert gas through my extractor actually improves its operation. The gas may be introduced through the line 10 at the bottom of the tower, for example. Since air increases corrosion in the tower it is generally advantageous to employ an inert gas for this purpose. If desired, the gas may be collected and recycled, which procedure soon eliminates any oxygen contained in the gas.

Another advantage of my extractor is that the plates need not necessarily be level. With the distributors shown in the drawings the liquid which is discharged from one distributor is forced to pass through the next succeeding distributor and, of course, it is immaterial whether a few of the ribbons of discharge liquid are of greater width than others, the contact area per unit of liquid remains constant.

If my tower is operated in such fashion that the acid liquor forms the continuous phase throughout the tower, it is possible to simplify my distributors by removing those parts which produce distribution of the heavier liquid. For example, the upper sections of all the distributors shown in Fig. 1 can be removed. I have found that there is only a slight decrease in the efficiency of extraction if this is done.

While I have described what I consider to be the best embodiments of my invention, various modifications can be made in the extractors which have been disclosed without departing from the purview of the present extractor. My invention can be employed for all operations in which liquids are extracted with other liquids, these liquids being substantially immiscible and having different specific gravities. Thus, it is possible to extract one liquid with two or more different liquids. For example, if it is desired to extract the paraffinic and naphthenic constituents from mineral oils, it is only necessary to introduce the oil in my tower centrally, one of the extracting liquids being introduced at the top and the other at the bottom of the tower or vice versa. In fact all recognized modes of countercurrent extraction can be effected in this type of apparatus; for example, simple countercurrent extraction, simple countercurrent extraction employing reflux or fractional distribution, the latter also with or without reflux. My towers can be made with widely different capacities. The capacity of a given tower is determined by the size and the number of slits per distributor, by the size of the distributors and also by the number of distributors per plate. These factors can, of course, be varied widely, producing corresponding variations in the capacities.

The swing pipe shown in Fig. 1 can be replaced by other devices capable of performing the same function, such as the usual liquid-level regulators, for example. The shape and the disposition of the slits used in my extractors can be varied widely. If relatively wide slits are employed, for example, the widths of these slits can be reduced toward their upper ends in order that ribbons of less thickness may be produced at the lower rates of flow. The slits may be arranged vertically or at an angle to the horizontal. The shapes of the distributors may be varied and it is also possible to vary the dimensions of the towers, which can be made square or rectangular, for example. Other modifications which fall within the scope of the following claims will be immediately evident to those skilled in this art.

What I claim is:

1. A liquid-liquid extractor comprising a tower, means for introducing and for removing a liquid containing substances to be extracted at opposite ends of said tower, means for introducing a liquid extracting agent into said tower at the end opposite the end at which the liquid to be extracted is introduced, means for removing said extracting agent at the end opposite its point of introduction, and a plurality of superimposed distributors provided with narrow slits arranged at a substantial angle to the horizontal mounted in said tower adapted to collect at least one of said liquids and to distribute it in the form of ribbon-like films, having a constant thickness but having a width varying with the rate of flow of said liquids, during its passage through said tower.

2. In a liquid-liquid extraction tower, a distributor for liquids passing through said tower in combination with a transverse plate, said distributor being provided with a set of narrow slits having a width of from about $\frac{1}{8}$th to $\frac{1}{64}$th inch arranged at a substantial angle to the horizontal both above and below said transverse plate, said plate and said slits being so constructed and arranged that the liquids passing upwardly and downwardly through said tower are collected and then directed through said slits in the form of ribbon-like films.

3. In a liquid-liquid extraction tower, a distributor for liquids passing through said tower in combination with a transverse plate, said distributor being provided with a set of narrow, substantially vertical slits both above and below said transverse plate, said plate and said slits being so constructed and arranged that the liquids passing upwardly and downwardly through said tower are collected and then directed through said slits in the form of ribbon-like films having a substantially constant thickness but having a width varying substantially in direct proportion to the rate of flow of said liquids.

4. The distributor of claim 3 wherein the width of said slits is within the range of from about 1/8th to 1/64th of an inch.

5. In a liquid-liquid extraction tower, a distributor for liquids passing through said tower in combination with a transverse plate, said distributor being provided with a set of slits having a width within the range of about 1/8th to 1/64th of an inch, said slits being disposed at an angle to the horizontal and so arranged in combination with said plate that at least one of the liquids passing through said tower is collected and is forced to pass through said slits in the form of ribbon-like films.

6. In a liquid-liquid extraction tower, a distributing means for liquids passing through said tower comprising means for collecting one of said liquids in combination with means for passing said collected liquid into a body of a second liquid in the form of ribbon-like films having a thickness of from about 1/8th to 1/64th inch and a width varying with the rate of flow of said liquid through said tower.

7. In a liquid-liquid extraction tower, a transverse plate adapted to collect at least one of the liquids passed through said tower, a distributor mounted on said plate provided with a plurality of slits arranged at a substantial angle to the horizontal and having a width of from about 1/8th to 1/64th inch, said distributor providing a passage through said plate for said collected liquid and being so constructed and arranged as to force liquid collected on said plate to pass through said slits in the form of ribbon-like films having a constant thickness but having a width varying substantially directly with the rate of flow of said liquid through said tower.

8. A distributor for a liquid-liquid extraction tower in combination with a transverse plate mounted in said tower; said distributor being mounted on said plate and comprising two series of vanes arranged at a substantial angle to the horizontal and defining narrow slit passages for the liquids passing through said tower, said vanes being mounted on opposite sides of a rectangular opening in said plate and enclosing said opening in such manner as to distribute the liquids passing through said opening in the form of ribbon-like films.

THOMAS C. ALBIN.